US012057723B2

(12) United States Patent
Lei et al.

(10) Patent No.: US 12,057,723 B2
(45) Date of Patent: Aug. 6, 2024

(54) SHARED CHARGING CABINET AND EJECTING CONTROL METHOD OF SHARED CHARGING CABINET AND COMPUTER STORAGE MEDIUM

(71) Applicant: SHENZHEN CARKU TECHNOLOGY CO., LIMITED, Guangdong (CN)

(72) Inventors: Yun Lei, Guangdong (CN); Zhifeng Zhang, Guangdong (CN); Bing Zhang, Guangdong (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 366 days.

(21) Appl. No.: 17/507,061

(22) Filed: Oct. 21, 2021

(65) Prior Publication Data
US 2022/0060035 A1 Feb. 24, 2022

Related U.S. Application Data

(63) Continuation of application No. PCT/CN2020/110458, filed on Aug. 21, 2020.

(51) Int. Cl.
H01M 10/46 (2006.01)
H02J 7/00 (2006.01)

(52) U.S. Cl.
CPC ........ *H02J 7/0044* (2013.01); *H02J 7/00032* (2020.01); *H02J 7/0013* (2013.01);
(Continued)

(58) Field of Classification Search
CPC .... H02J 7/0044; H02J 7/0042; H02J 7/00032; H02J 7/0047; H02J 7/0013;
(Continued)

(56) References Cited

U.S. PATENT DOCUMENTS

2011/0025267 A1 2/2011 Kamen et al.

FOREIGN PATENT DOCUMENTS

CN 107256597 A 10/2017
CN 108183530 A 6/2018
(Continued)

OTHER PUBLICATIONS

Machine translation of CN110298727A (Oct. 1, 2019) (Year: 2019).*
(Continued)

*Primary Examiner* — Edward Tso
(74) *Attorney, Agent, or Firm* — HAUPTMAN HAM, LLP

(57) ABSTRACT

A shared charging cabinet and an ejecting control method thereof are provided. The method includes the steps of: a comprehensive ranking of shared power supplies (200) currently contained in the shared charging cabinet (100) is performed according to lending times and remaining power of shared power supplies; when the shared charging cabinet (100) receives a lending instruction, one of the shared power supplies (200) is controlled to be ejected according to the comprehensive ranking in response to the lending instruction. Therefore, the ejecting order of the shared power supplies (200) in this application is determined according to the lending times and the remaining power of the shared power supplies (200), so that the ejecting times of the shared power supplies (200) in the shared charging cabinet (100) is balanced, and the service life of the shared power supplies (200) can be further balanced.

15 Claims, 3 Drawing Sheets

(52) U.S. Cl.
CPC ........ *H02J 7/0047* (2013.01); *H02J 7/00712* (2020.01); *H02J 7/007188* (2020.01)

(58) Field of Classification Search
CPC . H02J 7/007188; H02J 7/00712; Y02T 90/12; G60Q 30/0645
USPC ......... 320/107, 114, 116, 118, 119, 132, 149
See application file for complete search history.

(56) References Cited

FOREIGN PATENT DOCUMENTS

| | | | |
|---|---|---|---|
| CN | 109255068 | A | 1/2019 |
| CN | 110135935 | A | 8/2019 |
| CN | 110298727 | A | 10/2019 |
| CN | 111179506 | A | 5/2020 |
| WO | 2016153238 | A1 | 9/2016 |

OTHER PUBLICATIONS

The Extended European Search Report issued in corresponding EP Application No. EP20932835.0, mailed Jul. 20, 2022, pp. 1-7.
The International Search Report issued in corresponding PCT Application No. PCT/CN2020/110458, mailed Apr. 30, 2021, pp. 1-5, Beijing, China.

\* cited by examiner

SHARED CHARGING CABINET AND EJECTING CONTROL METHOD OF SHARED CHARGING CABINET AND COMPUTER STORAGE MEDIUM

CROSS-REFERENCE TO RELATED APPLICATIONS

This application is a continuation application of PCT Patent Application No. PCT/CN2020/110458, filed on Aug. 21, 2020, all of which are herein incorporated by reference in their entirety for all purposes.

TECHNICAL FIELD

The present disclosure relates to fields of shared charging, and in particular, to a shared charging cabinet and an ejecting control method thereof.

BACKGROUND

Shared power supplies are well known in the international and domestic markets. Compared with traditional mobile power supplies, shared power supplies have the advantages of convenience and emergency, so they are more and more accepted by the market and used in more and more fields. In order to meet the needs of the market while improving the cost-effectiveness of their products, they adopted a sorted ejecting method. For example, the shared power supplies that meet the power requirements are sorted cyclically according to the order of the charging slots and ejected in sequence. For example, there are twelve charging slots for accommodating the shared power supplies. Therein, only ten shared power supplies meet the power requirements. The ten charging slots for respectively accommodating ten shared power supplies are numbered by 1, 2, 3, 4, 5, 6, 7, 8, 10, 12. If one shared power supply is required to be ejected, the shared power supply where is accommodated in the charging slot 1 will be firstly ejected, and if needed, then, the shared power supplies where are respectively accommodated in the charging slot 2, 3, 4, 5, 6, 7, 8, 10, 12, will be ejected in sequence. The above scheme mainly ejects the battery according to the electric quantity of the shared power supplies and the order of the charging slots where are used for accommodating the shared power supplies. This may cause a shared power supply to be continuously ejected, continuously charged and discharged, which may reduce the service life of individual shared power supplies and cause uneven using life of the shared power supplies on the device.

SUMMARY

The present disclosure provides a shared charging cabinet and an ejecting control method thereof to solve the above technical problems.

The present disclosure provides an ejecting control method for a shared charging cabinet, which includes: a comprehensive sorting for shared power supplies currently contained in the shared charging cabinet is performed according to lending times and remaining power of each shared power supply; one of the shared power supplies currently contained in the shared charging cabinet is controlled to be ejected according to the comprehensive sorting when the shared charging cabinet receives a lending instruction and responds to the lending instruction.

The present disclosure also provides a shared charging cabinet, including a cabinet body and a plurality of charging slots defined on the cabinet body. Each charging slot is configured for accommodating a shared power supply for charging. The shared charging cabinet also includes a communication module. The communication module is used to establish a communication link with a communication module of an electronic device through a network. The shared charging cabinet also includes a processor and a storage. The storage stores computer program that can be executed by the processor. The processor executes the computer program to execute the steps of the ejecting control method described above.

The present disclosure also provides a computer storage medium that stores computer program that can be executed by the processor, and the computer program is executed by the processor to perform the steps of the above ejecting control method.

Therefore, the present disclosure sorts the ejecting sequence of the shared power supplies based on the lending times and the remaining power of each shared power supply, so that the ejecting times of the shared power supplies in the shared charging cabinet are more balanced and the service life is balanced.

BRIEF DESCRIPTION OF THE ACCOMPANYING DRAWINGS

In order to more clearly describe the technical solutions in the embodiments of the present disclosure, the following will briefly introduce the drawings that need to be used in the embodiments. Obviously, the drawings in the following description are only some embodiments of the present disclosure. For those of ordinary skill in the art, other drawings can be obtained based on these drawings without creative work.

DETAILED DESCRIPTION OF ILLUSTRATED EMBODIMENTS

The following will clearly and completely describe the technical solutions in the embodiments of the present disclosure with reference to the drawings in the embodiments of the present disclosure. Obviously, the described embodiments are only a part of the embodiments rather than all the embodiments of the present disclosure. Based on the embodiments in this present disclosure, all other embodiments obtained by those of ordinary skill in the art without creative work shall fall within the protection scope of this present disclosure.

The singular forms of "a", "an" and "the" used in the embodiments of the present disclosure and the appended claims are also intended to include plural forms, unless the context clearly indicates other meanings. It should also be understood that the term "and/or" as used herein refers to and includes any or all possible combinations of one or more associated listed items.

Unless otherwise defined, all technical and scientific terms used herein have the same meaning as commonly understood by those skilled in the technical field of this present disclosure. The terminology used in the specification of the present disclosure herein is only for the purpose of describing specific embodiments, and is not intended to limit the present disclosure.

Figure 1:
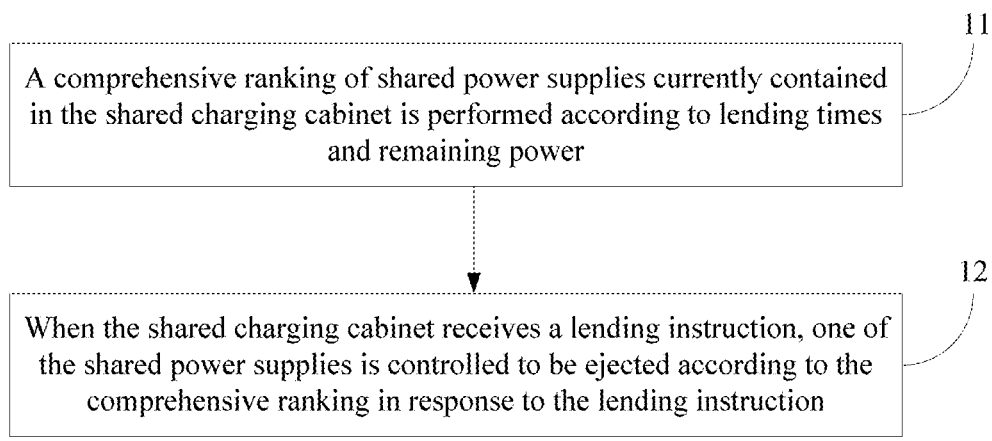
FIG. 1 is a schematic flowchart of an ejecting control method of shared power supplies in one embodiment of the present disclosure.
Figure 2:
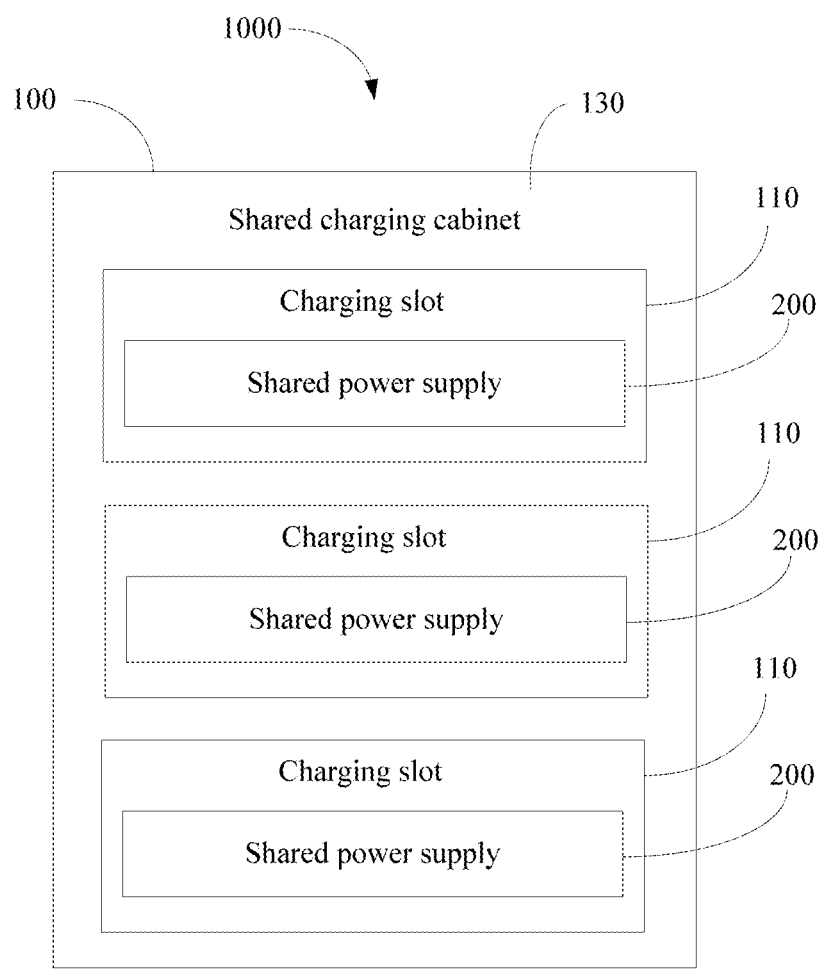
FIG. 2 is a schematic diagram of modules of a shared charging system in one embodiment of the present disclosure.

Please referring to FIG. 1, FIG. 1 is a schematic flowchart of an ejecting control method of shared power supplies in one embodiment of the present disclosure. It is understandable that a sequence of the ejecting control method of the shared power supplies can be adjusted, which is not limited here. Please also referring to FIG. 2, FIG. 2 is a schematic diagram of modules of a shared charging system in one embodiment of the present disclosure. The ejecting control method of the shared power supplies is applied to the shared charging system shown in FIG. 2. The shared charging system 1000 includes a shared charging cabinet 100 and a plurality of shared power supplies 200 (only three shared power supplies 200 are shown in FIG. 2, which is not limited in practice). The shared charging cabinet 100 defines a plurality of charging slots 110. The plurality of shared power supplies 200 can be respectively accommodated in the plurality of charging slots 110 and can be charged. When the shared power supply 200 is charged in the charging slot 110, a one-to-one correspondence is established between the shared power supply 200 and the charging slot 110. The shared power supply 200 can be lent out and used to charge an electronic device. At this time, the corresponding relationship between the shared power supply 200 and the charging slot 110 is deleted. After the shared power supply 200 is returned to another charging slot 110, a one-to-one correspondence between the shared power supply 200 and the another charging slot 110 is re-established. Specifically, the ejecting control method of the shared power supplies 200 includes following steps.

Step 11: a comprehensive sorting for shared power supplies 200 currently contained in the shared charging cabinet 100 is performed according to lending times and remaining power of each shared power supply 200.

Step 12: when the shared charging cabinet 100 receives a lending instruction, the shared charging cabinet 100 controls one of the shared power supplies 200 to be ejected according to the comprehensive sorting in response of the lending instruction.

Therefore, in the present disclosure, the ejecting sequence of the shared power supplies 200 is comprehensively determined based on the lending times and the remaining power of each shared power supply 200, so that the lending times of each shared power supply 200 in the shared charging cabinet 100 is more balanced and the service life is balanced.

Optionally, in one embodiment, the step 11 specifically includes following steps.

A priority of the lending times and a priority of the remaining power of each shared power supply 200 are determined. The priority of the shared power supply 200 with a small lending times is higher than the priority of the shared power supply 200 with a large lending times. A priority of the shared power supply 200 with more remaining power is higher than a priority of the shared power supply 200 with less remaining power.

A comprehensive priority of each shared power supply 200 is determined according to the priority of the lending times and the priority of the remaining power of each shared power supply 200.

The shared power supplies 200 currently contained in the shared charging cabinet 100 are comprehensively sorted according to the comprehensive priority of each shared power supply 200.

Therefore, in this present disclosure, the shared power supply 200 with a small lending times is determined as a high priority, so that the shared power supply 200 with a small lending times can be lent first. Thus, the lending times of the shared power supplies 200 in the shared charging cabinet 100 can be balanced. In turn, the service life of the shared power supplies 200 in the shared charging cabinet 100 is balanced, a series of problems caused by the uneven life of the shared power supplies 200 are avoided. The overall management and maintenance of the shared power supplies 200 are facilitated.

Optionally, in one embodiment, the power of the shared power supplies 200 can be divided into multiple levels according to the amount of power. For example, the shared power supply 200 can be divided into ten levels according to each 10% of the power, for example, the power of level 1 is 0%-10%, the power of level 2 is 10%~20%, the power of level 3 is 20%~30%, the power of level 4 is 30%-40%, the power of level 5 is 40%~50%, the power of level 6 is 50%~60%, the power of level 7 is 60%~70%, the power of level 8 is 70%~80%, the power of level 9 is 80%~90%, and the power of level 10 is 90%~100%. Moreover, in actual use, in order to ensure that the lent shared power supply 200 has enough power, the shared power supply 200 to be lent is set when the power reaches level 7. It is understandable that, in another embodiment, the shared power supply 200 may be classified according to whether the power is sufficient, and the shared power supply 200 with a power of more than 60% can be classified. For example, the power of the level A is 60%~70%, the power of level B is 70%~80%, the power of level C is 80%~90%, and the power of level D is 90%~100%. It is understandable that there is no limitation on the classification method of the shared power supplies 200. When there is a shared power supply 200 accommodated in one charging slot 110 of the shared charging cabinet 100 for charging, the power of the shared power supply 200 is monitored in real time, and the shared power supply 200 is classified according to its power. It can be understood that the division of the charging level is updated at every preset time interval. The preset time interval is every 1 minute, 10 minutes, 30 minutes, etc., which are not limited here.

Optionally, in one embodiment, the comprehensive priority of each shared power supply 200 is determined according to the priority of the lending times and the priority of the remaining power of each shared power supply 200, including following steps.

The preset weights respectively corresponding to the priority of the lending times and the priority of the remaining power of the shared power supply 200 are obtained. In detail, the preset weights respectively corresponding to the priority of the lending times and the priority of the remaining power can be determined according to needs. For example, if the comprehensive priority of each shared power supply 200 is needed to determine more based on the priority of the lending times, the preset weight corresponding to the priority of the lending times will be larger than the preset weight corresponding to the priority of the remaining power. Otherwise, if the comprehensive priority of each shared power supply 200 is needed to determine more based on the priority of the remaining power, the preset weight corresponding to the priority of the lending times will be less than the preset weight corresponding to the priority of the remaining power.

The priority of the lending times of each shared power supply 200 is multiplied by the corresponding preset weight, and the priority of the remaining power of the shared power supply 200 is multiplied by the corresponding preset weight, and then the two are added to get the comprehensive priority of each shared power supply 200.

For example, the preset weight of the priority of the lending times of shared power supply 200 is a1, and the preset weight of the priority of the remaining power is a2, a1+a2=1; then the comprehensive priority of the shared power supply 200=the priority of the lending times*a1+the priority of the remaining power*a2.

Therefore, the present disclosure can correspondingly set the weight of the priority of the lending times and the weight of the priority of the remaining power of the shared power supply 200, so as to determine the comprehensive priority suitable for the demand according to needs, such that the comprehensive priority of the shared power supply 200 is more reasonable.

Optionally, in another embodiment, the step 11 includes following steps.

The preset weight corresponding to the lending times and the preset weight corresponding to the remaining power of the shared power supply 200 are obtained respectively.

The lending times of each shared power supply 200 is multiplied by the corresponding preset weight, and the remaining power of the shared power supply 200 is multiplied by the corresponding preset weight, and then the two are added to obtain a comprehensive sorting value of each shared power supply 200.

The shared power supplies 200 currently contained in the shared charging cabinet 100 are sorted according to their comprehensive sorting value.

Therefore, the preset weights respectively corresponding to the lending times and the remaining power can be determined according to needs. For example, if the comprehensive sorting value of each shared power supply 200 is needed to determine more based on the lending times, the preset weight corresponding to the lending times will be larger than the preset weight corresponding to the remaining power. Otherwise, if the comprehensive priority of each shared power supply 200 is needed to determine more based on the priority of the remaining power, the preset weight corresponding to the priority of the lending times will be less than the preset weight corresponding to the priority of the remaining power. The present disclosure can also achieve comprehensive sorting by obtaining the preset weights of the lending times and the preset weights of the remaining power of the shared power supplies 200, which simplifies a calculation process.

It is understandable that the above-mentioned comprehensive sorting process can be executed once every preset time interval, once every power supply returning event occurs, and/or once every power supply lending event occurs.

Optionally, in one embodiment, when the above-mentioned comprehensive sorting process occurs after a power supply returning event, and before step 11, the ejecting control method of the shared power supply 200 further includes following steps.

When the shared charging cabinet 100 receives a returning instruction sent by the electronic device, the currently vacant charging slots 110 of the shared charging cabinet 100 are determined.

When the shared power supply 200 is returned to the currently vacant charging slot 110, the charging times of the shared power supply 200 is updated.

Optionally, in one embodiment, the ejecting control method of the shared power supply 200 further includes a following step.

When the shared charging cabinet 100 receives the returning instruction sent by the electronic device, one or more of the currently vacant charging slots 110 are controlled to be flashing to prompt the user, to return the shared power supply 200 to the currently vacant charging slot 110. Thus, the user is reminded to return to the corresponding charging slot 110.

Optionally, in one embodiment, when the above-mentioned comprehensive sorting process occurs after a power supply lending event, the ejecting control method of the shared power supply 200 further includes following steps.

When the shared charging cabinet 100 controls one of the shared power supplies 200 to be ejected, the charging slot 110 where the shared power supply 200 is ejected is set to an empty state, and all the current shared power supplies 200 in the shared charging cabinet 100 are comprehensively sorted according to their lending times and remaining power.

Therefore, the present disclosure can reorder the shared power supplies 200 in the shared charging cabinet 100 after the power supply lending event and the power supply returning event.

Optionally, in one embodiment, when the above-mentioned comprehensive sorting process occurs after every preset time interval, the ejecting control method of the shared power supply 200 further includes following steps.

Every time the shared power supply 200 is reordered, start timing.

The timing duration is determined whether it reaches a preset time interval.

After the timing duration reaches the preset time interval, the shared power supplies 200 currently contained in the shared charging cabinet 100 are comprehensively sorted according to their lending times and remaining power.

Therefore, after the shared power supply 200 is charged and its power level changes, the shared power supplies 200 currently received in the shared charging cabinet 100 can be comprehensively sorted according to their lending times and the remaining power.

Please referring to FIG. 2, FIG. 2 is a schematic diagram of modules of a shared charging system in one embodiment of the present disclosure. The shared charging system 1000 includes a shared charging cabinet 100 and a plurality of shared power supplies 200. The shared charging cabinet 100 defines a plurality of charging slots 110. The plurality of shared power supplies 200 can be respectively accommodated in the plurality of charging slots 110 and can be charged. When the shared power supply 200 is charged in the charging slot 110, a one-to-one correspondence is established between the shared power supply 200 and the charging slot 110. The shared power supply 200 can be lent and used to charge electronic devices. At this time, the corresponding relationship between the shared power supply 200 and the charging slot 110 is deleted. After the shared power supply 200 is returned to another charging slot 110, a one-to-one correspondence between the shared power supply 200 and the another charging slot 110 is re-established.

Figure 3:
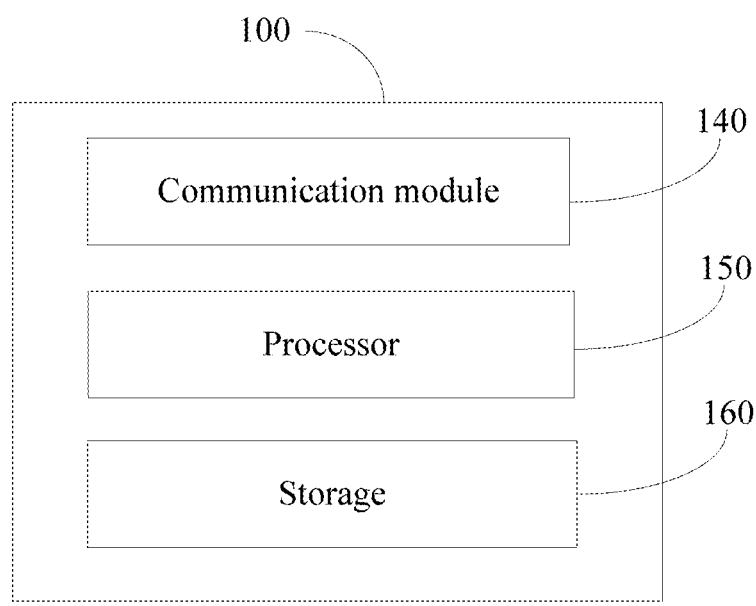
FIG. 3 is a schematic diagram of modules of a shared charging cabinet in one embodiment of the present disclosure.

Specifically, the shared charging cabinet 100 includes a cabinet body 130 and a plurality of charging slots 110 defined in the cabinet body 130, and each charging slot 110 is provided with a charging stand (not shown) and an ejecting module (not shown), so the charging stand is used to charge the shared power supply 200 contained in the charging slot 110, and the ejecting module is used to eject the shared power supply 200 when the shared power supply 200 needs to be ejected. It can be understood that the ejecting module may be a magnetic ejection or a push rod ejection, etc., which is not limited herein. Please referring to FIG. 3, FIG. 3 is a schematic diagram of a shared charging cabinet in one embodiment of the present disclosure. The shared charging cabinet 100 also includes a communication module 140, which establishes a communication link with a communication module of the electronic device through a network. The network may be, but is not limited to, an Internet or an on-demand virtual private line, a wireless network including WIFI and Bluetooth, telephone network including GPRS network and CDMA network, radio and television network, etc.

The shared charging cabinet 100 also includes a processor 150 and a storage 160. The storage 160 stores computer programs that can be run by the processor 150, and the processor 150 runs the computer programs to execute the following steps of the ejecting control method of the shared power supplies 200.

A comprehensive sorting for shared power supplies 200 currently contained in the shared charging cabinet 100 is performed according to lending times and remaining power.

When the shared charging cabinet 100 receives a lending instruction, the shared charging cabinet 100 responds to the lending instruction and controls one of the shared power supplies 200 to be ejected according to the comprehensive sorting.

Therefore, in the present disclosure, the processor 150 controls the sorting of the ejecting sequence of the shared power supplies 200 based on the lending times and the remaining power of the shared power supplies 200, so that the ejecting times of the shared power supplies 200 in the shared charging cabinet 100 are more balanced and the service life is balanced.

Optionally, in one embodiment, the processor 150 executes the step of running the computer program "a comprehensive sorting for shared power supplies 200 currently contained in the shared charging cabinet 100 is performed according to lending times and remaining power", including following.

A priority of the lending times and a priority of the remaining power of each shared power supply 200 are determined. A priority of the shared power supply 200 with a small lending times is higher than a priority of the shared power supply 200 with a large lending times. A priority of shared power supply 200 with more remaining power is higher than a priority of shared power supply 200 with less remaining power.

A comprehensive priority of each shared power supply 200 is determined according to the priority of the lending times and the priority of the remaining power of each shared power supply 200.

The shared power supply 200 currently contained in the shared charging cabinet 100 is comprehensively sorted according to the comprehensive priority.

Therefore, in this present disclosure, the shared power supply 200 with a small lending times is determined as a high priority, so that the shared power supply 200 with a small lending times can be lent first. Therefore, the lending times of each shared power supply 200 in the shared charging cabinet 100 can be balanced, so as to balance the service life of each shared power supply 200, avoid a series of problems caused by the uneven service life of the shared power supply 200, and facilitate the overall management and maintenance of the shared power supply 200.

Optionally, in one embodiment, the steps executed by the processor 150 to run the computer program "a comprehensive priority of each shared power supply 200 is determined according to the priority of the lending times and the priority of the remaining power of each shared power supply 200", including following.

The preset weights respectively corresponding to the priority of the lending times and the priority of the remaining power of the shared power supply 200 are obtained. In detail, the preset weights respectively corresponding to the priority of the lending times and the priority of the remaining power can be determined according to needs. For example, if the comprehensive priority of each shared power supply 200 is needed to determine more based on the priority of the lending times, the preset weight corresponding to the priority of the lending times will be larger than the preset weight corresponding to the priority of the remaining power. Otherwise, if the comprehensive priority of each shared power supply 200 is needed to determine more based on the priority of the remaining power, the preset weight corresponding to the priority of the lending times will be less than the preset weight corresponding to the priority of the remaining power.

The priority of the lending times of each shared power supply 200 is multiplied by the corresponding preset weight, and the priority of the remaining power of the shared power supply 200 is multiplied by the corresponding preset weight, and then the two are added to get the comprehensive priority of each shared power supply 200. [64] For example, the preset weight of the priority of the lending times of the shared power supply 200 is a1, and the preset weight of the priority of the remaining power is a2, a1+a2=1; then the comprehensive priority of the shared power supply 200=the priority of the lending times*a1+the priority of the remaining power*a2.

Therefore, the present disclosure can correspondingly set the weight of the priority of the lending times and the weight of the priority of the remaining power of the shared power supply 200 to determine the comprehensive priority suitable for the demand according to the needs, so that the comprehensive priority of the shared power supply 200 is more reasonable.

Optionally, in one embodiment, the step performed by the processor 150 to run the computer program is "a comprehensive sorting for shared power supplies 200 currently contained in the shared charging cabinet 100 is performed according to lending times and remaining power", including following.

The preset weights of the lending times and the remaining power of shared power supply 200 are obtained respectively.

The lending times of each shared power supply 200 is multiplied by the corresponding preset weight, and the remaining power of the shared power supply 200 is multiplied by the corresponding preset weight, and then the two are added to obtain a comprehensive sorting value of each shared power supply 200.

The shared power supplies 200 currently contained in the shared charging cabinet 100 are sorted according to their comprehensive sorting value.

Therefore, the preset weights respectively corresponding to the lending times and the remaining power can be determined according to needs. For example, if the comprehensive sorting value of each shared power supply 200 is needed to determine more based on the lending times, the preset weight corresponding to the lending times will be larger than the preset weight corresponding to the remaining power. Otherwise, if the comprehensive priority of each shared power supply 200 is needed to determine more based on the priority of the remaining power, the preset weight corresponding to the priority of the lending times will be less than the preset weight corresponding to the priority of the remaining power. The present disclosure can also achieve comprehensive sorting by obtaining the preset weights of the lending times and the preset weights of the remaining power of the shared power supplies 200, which simplifies a calculation process.

It is understandable that the above-mentioned comprehensive sorting process can be executed once every preset time interval, once every power supply returning event occurs, and/or once every power supply lending event occurs.

Optionally, in one embodiment, when the above-mentioned comprehensive sorting process occurs after a power supply returning event, and before step 11, the steps executed by the processor running the computer program further include following steps.

When the communication module 140 receives a returning instruction sent by the electronic device, the currently vacant charging slot 110 of the shared charging cabinet 100 is determined.

When the shared power supply 200 is returned to the currently vacant charging slot 110, the charging times of the shared power supply 200 is updated.

Optionally, in one embodiment, the steps executed by the processor running the computer program further include following.

When the communication module 140 receives the returning instruction sent by the electronic device, one or more of the currently vacant charging slots 110 are controlled to be flashing to prompt the user to return the shared power supply 200 to the currently vacant charging slot 110.

Optionally, in one embodiment, when the above-mentioned comprehensive sorting process occurs after the power supply lending event, the steps executed by the processor 150 by running the computer program further includes following.

When one of the shared power supplies 200 is controlled to be ejected, the charging slot 110 of the shared power supply 200 is set to an empty state, and all the shared power supplies 200 currently accommodated in the shared charging cabinet 100 are comprehensively sorted according to their lending times and remaining power.

Therefore, the shared power supplies 200 in the shared charging cabinet 100 can be reordered after the power supply lending event and the power supply returning event.

Optionally, in one embodiment, when the above-mentioned comprehensive sorting process occurs after every preset time interval, the steps executed by the processor 150 running the computer program further include following steps.

Every time the shared power supply 200 is reordered, start timing.

The timing duration is determined whether it reaches a preset time interval.

After the timing duration reaches the preset time interval, the shared power supplies 200 currently contained in the shared charging cabinet 100 are comprehensively sorted according to their lending times and remaining power.

Therefore, after the shared power supply 200 is charged and its power level changes, the shared power supplies 200 currently received in the shared charging cabinet 100 can be comprehensively sorted according to their lending times and remaining power.

An embodiment of the present disclosure also provides a computer storage medium, wherein the computer storage medium stores a computer program, and the computer program causes the computer to execute the above method to achieve part or all of the steps of the eject control method of shared power supplies.

It should be noted that for the foregoing method embodiments, for the sake of simple description, they are all expressed as a series of action combinations, but those skilled in the art should know that the present disclosure is not limited by the described sequence of actions, because some steps can be performed in other order or simultaneously according to the present disclosure. Secondly, those skilled in the art should also be aware that the embodiments described in the specification are optional embodiments, and the actions and modules involved are not necessarily required by the present disclosure.

In the above-mentioned embodiments, the description of each embodiment has its own emphasis. For parts that are not described in detail in an embodiment, reference may be made to related descriptions of other embodiments.

In the several embodiments provided in the present disclosure, it should be understood that the disclosed shared charging cabinet 100 can be implemented in other ways. For example, the embodiment of the shared charging cabinet 100 described above is only illustrative. For example, the division of the units is only a logical function division. In actual implementation, there may be other division methods, for example, multiple units or components can be divided. It can be combined or integrated into another system, or some features can be ignored or not implemented. In addition, the displayed or discussed mutual coupling or direct coupling or communication connection may be indirect coupling or communication connection through some interfaces, devices or units, and may be in electrical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit. The above-mentioned integrated unit can be implemented in the form of hardware or software program module. The storage 160 may include a flash disk, a read-only memory (ROM), a random access memory (RAM), a magnetic disk or an optical disk, etc.

In addition, the processor 150 may be a general-purpose processor, a digital signal processor, a specific integrated circuit, an off-the-shelf programmable gate array or other programmable logic device, a discrete gate or transistor logic device, or a discrete hardware component. The processor may implement or execute the methods, steps, and logical block diagrams disclosed in the embodiments of the present disclosure. The processor may be an image processor, a microprocessor, or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software module can be located in a mature storage medium in the field, such as random access memory, flash memory, read-only memory, programmable read-only memory, or electrically erasable programmable memory, registers. The storage medium is located in the storage. For example, the processor 150 can read programs, computer instructions or data in the storage, and complete the steps of the foregoing method executed by the shared charging cabinet 100 in combination with its hardware.

The embodiments of the present disclosure are described in detail above, and specific examples are used in this article to illustrate the principles and embodiments of the present disclosure. The descriptions of the above embodiments are only used to help understand the methods and core ideas of the present disclosure; at the same time, for those of ordinary skill in the art, based on the ideas of the present disclosure, will have changes in the specific embodiments and invention scope. In summary, the content of this specification should not be construed as limiting the present disclosure.

What is claimed is:

1. An ejecting control method of a shared charging cabinet, comprising:
   performing a comprehensive sorting of shared power supplies currently contained in the shared charging cabinet according to lending times and remaining power of shared power supplies;
   starting timing every time a shared power supply is reordered;
   determining whether a timing duration reaches a preset time interval;
   comprehensively sorting the shared power supplies currently contained in the shared charging cabinet according to the lending times and the remaining power of the shared power supplies when the timing duration reaches the preset time interval; and
   when the shared charging cabinet receives a lending instruction, controlling one of the shared power supplies to be ejected according to the comprehensive sorting in response to the lending instruction.

2. The ejecting control method of the shared charging cabinet according to claim 1, wherein performing a comprehensive sorting of shared power supplies currently contained in the shared charging cabinet according to lending times and remaining power of shared power supplies, comprises:
   determining a priority of the lending times and a priority of the remaining power of each shared power supply wherein, a priority of the shared power supply with a small lending times is higher than a priority of the shared power supply with a large lending times; a priority of the shared power supply with more remaining power is higher than a priority of the shared power supply with less remaining power;
   determining a comprehensive priority of each shared power supply according to the priority of the lending times and the priority of the remaining power of each shared power supply; and
   comprehensively sorting the shared power supplies currently contained in the shared charging cabinet according to the comprehensive priority of each shared power supply.

3. The ejecting control method of the shared charging cabinet according to claim 1, wherein determining a comprehensive priority of each shared power supply according to the priority of the lending times and the priority of the remaining power of each shared power supply, comprises:
   respectively obtaining preset weights corresponding to the priority of the lending times and the priority of the remaining power of each shared power supply; and
   multiplying the priority of the lending times of each shared power supply by the corresponding preset weight to obtain a first value, and multiplying the priority of the remaining power of the shared power supply by the corresponding preset weight to obtain a second value, and then adding the first value and the second value to obtain the comprehensive priority of each shared power supply.

4. The ejecting control method of the shared charging cabinet according to claim 1, wherein performing a comprehensive sorting of shared power supplies currently contained in the shared charging cabinet according to lending times and remaining power of shared power supplies comprises:
   respectively obtaining preset weights corresponding to the lending times and the remaining power of the shared power supply;
   multiplying the lending times of each shared power supply with the corresponding preset weight to obtain a first value, and multiplying the remaining power of the shared power supply with the corresponding preset weight to obtain a second value, and then adding the first value and the second value to obtain a comprehensive sorting value of each shared power supply; and
   sorting the shared power supplies currently contained in the shared charging cabinet according to the comprehensive sorting values of the shared power supplies.

5. The ejecting control method of the shared charging cabinet according to claim 1, wherein the ejecting control method of the shared power supply further comprises:
   determining currently vacant charging slot of the shared charging cabinet when the shared charging cabinet receives a returning instruction sent by the electronic device; and
   updating a charging times of the shared power supply when the shared power supply is returned to the charging slot.

6. The ejecting control method of the shared charging cabinet according to claim 5, wherein the ejecting control method of the shared power supply further comprises:
   controlling prompt lights of one or more currently vacant charging slots to flash to remind a user to return the shared power supply to one currently vacant charging slot when the shared charging cabinet receives the returning instruction sent by the electronic device.

7. The ejecting control method of the shared charging cabinet according to claim 1, wherein the ejecting control method of the shared power supply further comprises:
   when the shared charging cabinet ejects one of the shared power supplies, the charging slot where the shared power supply is ejected is set to an empty state, and all the shared power supplies currently accommodated in the shared charging cabinet are comprehensively sorted according to the lending times and the remaining power of the shared power supplies.

8. A shared charging cabinet, comprising a cabinet body and a plurality of charging slots defined on the cabinet body, wherein each charging slot is used for accommodating a shared power supply for charging; the shared charging cabinet also comprises a communication module; the communication module is used to establish a communication link with a communication module of the electronic device through a network; the shared charging cabinet also comprises a processor and a storage; the storage stores a computer program that can be run by the processor, so the processor runs the computer program to execute following steps:
   performing a comprehensive sorting of shared power supplies currently contained in the shared charging cabinet according to lending times and remaining power of shared power supplies;

starting timing every time the shared power supply is reordered;

determining whether a timing duration reaches a preset time interval;

comprehensively sorting the shared power supplies currently contained in the shared charging cabinet according to the lending times and the remaining power of the shared power supplies when the timing duration reaches the preset time interval; and when the shared charging cabinet receives a lending instruction, controlling one of the shared power supplies to be ejected according to the comprehensive sorting in response to the lending instruction.

9. The shared charging cabinet according to claim 8, wherein the processor runs the computer program to perform the comprehensive sorting comprising:

determining a priority of the lending times and a priority of the remaining power of each shared power supply; wherein, a priority of the shared power supply with a small lending times is higher than a priority of the shared power supply with a large lending times; a priority of the shared power supply with more remaining power is higher than a priority of the shared power supply with less remaining power;

determining a comprehensive priority of each shared power supply according to the priority of the lending times and the priority of the remaining power of each shared power supply; and comprehensively sorting the shared power supplies currently contained in the shared charging cabinet according to the comprehensive priority of each shared power supply.

10. The shared charging cabinet according to claim 9, wherein the processor runs the computer program to determine the comprehensive priority comprising:

respectively obtaining preset weights corresponding to the priority of the lending times and the priority of the remaining power of each shared power supply; and multiplying the priority of the lending times of each shared power supply by the corresponding preset weight to obtain a first value, and multiplying the priority of the remaining power of the shared power supply by the corresponding preset weight to obtain a second value, and then adding the first value and the second value to obtain the comprehensive priority of each shared power supply.

11. The shared charging cabinet according to claim 8, wherein the processor runs the computer program to perform the comprehensive sorting comprising:

respectively obtaining preset weights corresponding to the lending times and the remaining power of the shared power supply;

multiplying the lending times of each shared power supply with the corresponding preset weight to obtain a first value, and multiplying the remaining power of the shared power supply with the corresponding preset weight to obtain a second value, and then adding the first value and the second value to obtain a comprehensive sorting value of each shared power supply; and sorting the shared power supplies currently contained in the shared charging cabinet according to the comprehensive sorting values of the shared power supplies.

12. The shared charging cabinet according to claim 8, wherein the processor runs the computer program to further execute following steps:

determining currently vacant charging slot of the shared charging cabinet when the shared charging cabinet receives a returning instruction sent by the electronic device; and updating a charging times of the shared power supply when the shared power supply is returned to the charging slot.

13. The shared charging cabinet according to claim 12, wherein the processor runs the computer program to further execute following steps:

controlling prompt lights of one or more currently vacant charging slots to flash to remind a user to return the shared power supply to one currently vacant charging slot when the shared charging cabinet receives the returning instruction sent by the electronic device.

14. The shared charging cabinet according to claim 8, wherein the processor runs the computer program to further execute following steps:

when the shared charging cabinet ejects one of the shared power supplies, the charging slot where the shared power supply is ejected is set to an empty state, and all the shared power supplies currently accommodated in the shared charging cabinet are comprehensively sorted according to the lending times and the remaining power of the shared power supplies.

15. A computer storage medium, wherein the computer storage medium stores a computer program that can be executed by the processor, and the computer program is executed by the processor to perform following steps:

performing a comprehensive sorting of shared power supplies currently contained in the shared charging cabinet according to lending times and remaining power of shared power supplies;

starting timing every time a shared power supply is reordered;

determining whether a timing duration reaches a preset time interval;

comprehensively sorting the shared power supplies currently contained in the shared charging cabinet according to the lending times and the remaining power of the shared power supplies when the timing duration reaches the preset time interval; and when the shared charging cabinet receives a lending instruction, controlling one of the shared power supplies to be ejected according to the comprehensive sorting in response to the lending instruction.

* * * * *